US008321476B2

(12) United States Patent
Kirk et al.

(10) Patent No.: US 8,321,476 B2
(45) Date of Patent: Nov. 27, 2012

(54) METHOD AND SYSTEM FOR DETERMINING BOUNDARY VALUES DYNAMICALLY DEFINING KEY VALUE BOUNDS OF TWO OR MORE DISJOINT SUBSETS OF SORT RUN-BASED PARALLEL PROCESSING OF DATA FROM DATABASES

(75) Inventors: Steven A. Kirk, Chelmsford, MA (US); Kurt Deschler, Marborough, MA (US); David E. Walrath, Stow, MA (US)

(73) Assignee: Sybase, Inc., Dublin, CA (US)

( * ) Notice: Subject to any disclaimer, the term of this patent is extended or adjusted under 35 U.S.C. 154(b) by 149 days.

(21) Appl. No.: 12/749,365

(22) Filed: Mar. 29, 2010

(65) Prior Publication Data

US 2011/0238677 A1 Sep. 29, 2011

(51) Int. Cl.
*G06F 17/30* (2006.01)
(52) U.S. Cl. .................. 707/807; 707/802; 707/803
(58) Field of Classification Search ............. 706/45–50; 705/600, 694–698, 748, 778–779, 792, 797; 707/600, 694–698, 748, 778–779, 792, 797, 707/800–810
See application file for complete search history.

(56) References Cited

U.S. PATENT DOCUMENTS

| 5,146,590 | A  | * | 9/1992  | Lorie et al. ..................... 1/1 |
| 5,434,992 | A  | * | 7/1995  | Mattson ....................... 711/119 |
| 5,987,468 | A  | * | 11/1999 | Singh et al. .................... 1/1 |
| 6,012,080 | A  | * | 1/2000  | Ozden et al. ................. 718/102 |
| 6,230,151 | B1 | * | 5/2001  | Agrawal et al. ................ 706/12 |
| 6,374,232 | B1 | * | 4/2002  | Dageville et al. ............... 1/1 |
| 6,609,123 | B1 | * | 8/2003  | Cazemier et al. ............... 1/1 |
| 7,162,464 | B1 | * | 1/2007  | Miller et al. ................... 706/50 |
| 2004/0034616 | A1 | * | 2/2004 | Witkowski et al. .............. 707/1 |
| 2005/0235356 | A1 | * | 10/2005 | Wang ............................ 726/22 |
| 2006/0218123 | A1 | * | 9/2006 | Chowdhuri et al. ............. 707/2 |
| 2007/0005556 | A1 | * | 1/2007 | Ganti et al. ..................... 707/1 |
| 2007/0005598 | A1 | * | 1/2007 | Okamoto et al. ................ 707/7 |
| 2007/0143313 | A1 | * | 6/2007 | Cotner et al. ................. 707/100 |
| 2007/0294221 | A1 | * | 12/2007 | Chen et al. ...................... 707/3 |
| 2008/0235260 | A1 | * | 9/2008 | Han et al. ..................... 707/102 |
| 2008/0243768 | A1 | * | 10/2008 | Freedman et al. ............... 707/2 |
| 2009/0276428 | A1 | * | 11/2009 | Ahn et al. ........................ 707/7 |
| 2010/0191717 | A1 | * | 7/2010 | Graefe ......................... 707/713 |
| 2010/0318499 | A1 | * | 12/2010 | Arasu et al. .................. 707/693 |
| 2011/0087684 | A1 | * | 4/2011 | Junqueira et al. ............. 707/764 |

OTHER PUBLICATIONS

Vivek Kale et al. "Parallel Sorting Pattern",workshop at the 2nd Annual Conference on Parallel Programming Patterns (ParaPLoP),Mar. 30-31, 2010, Carefree, AZ.*
Remzi H. Arpaci et al. "NOW-Sort: A Scalable, Commodity-Workstation Sort",Final Project Report,CS-286: Implementation of Database Systems, May 10, 1996—pp. 1-14.*
Kuninobo Tanno et al. "A Parallel Sorting Algorithm on eight-neighbor processor array",1992 JEEE, pp. 456-468.*
Balakrishna Iyer et al. "System Issues in Parallel Sorting for Database Systems", 1990 IEEE, pp. 246-255.*
Goetz Graefe, "Implementing Sorting in Database Systems", ACM Computing Surveys, vol. 38 n. 3, Sep. 2006.

* cited by examiner

*Primary Examiner* — Srirama Channavajjala
(74) *Attorney, Agent, or Firm* — Sterne, Kessler, Goldstein & Fox Fox

(57) ABSTRACT

A system, method, and computer program product are provided for sorting a set of records in a sort run. As the records are sorted, metadata regarding the sort run is gathered, and subsequently used to determine bounds of two or more disjoint subsets of the sort run. This enables the parallelization of several tasks over the sort run data using efficient, dynamic bounds determination, such as the outputting of sorted data from the disjoint subsets in parallel.

20 Claims, 6 Drawing Sheets

METHOD AND SYSTEM FOR DETERMINING BOUNDARY VALUES DYNAMICALLY DEFINING KEY VALUE BOUNDS OF TWO OR MORE DISJOINT SUBSETS OF SORT RUN-BASED PARALLEL PROCESSING OF DATA FROM DATABASES

BACKGROUND OF INVENTION

1. Field of the Invention

The present invention relates generally to databases and, more specifically, to parallel processing of data from databases.

2. Description of the Background Art

Database products are commonly written to be able to handle sets of data that far exceed the available memory. This is typically accomplished through the use of "disk sort" or "external sort" algorithms. In a disk sort, arriving data is packaged as records and then placed into a set of pages. When the set of pages reaches some memory limit, the data is sorted, resulting in a "sort run". This sort run is then released from cache and allowed to page to disk, so a new sort run can be created using additional data. Data is read out from several sort runs using one of several techniques in a merging process. This allows data from two or more sort runs to be read out in sorted order.

As the volume of data processed using sort runs and other database techniques increases, a common solution to improve performance is to increase hardware capacity. One area where significant capacity increases have been seen lately is in multi-core/multi-processor systems. However, in order to effectively use this capacity in a database product, the database must be able to efficiently enable queries to simultaneously use multiple cores or multiple processors to operate on data.

Query parallelism is commonly enabled by dividing the data to be processed into disjoint subsets, and then applying query operators on each of the subsets simultaneously on parallel execution threads. However, this data division commonly relies on a database administrator to specify the division points, and likely based only on one or two sets of key columns, and with only a few division points potentially resulting in large data sets. The decision to specify division points must also be made at latest at query optimization time, with no ability to correct for uneven distribution of rows among the disjoint sets.

Additional efforts to parallelize these disk sort techniques for database use have also primarily focused on parallelization within the sort operation itself. These techniques include placing the insertion of records into sort runs on separate threads of execution from the sorting of records within a sort run, parallelization of comparison operations within a champion tree being used during the merging process, and having multiple threads inserting records concurrently into separate sort runs.

Few efforts have concentrated on parallelization of the operations that are dependent on the results of the disk sort. The predominant technique is the use of key-based binning, where records are separated into two or more "bins" based on a range of key values. Sets of sort runs corresponding to a same bin, having key values corresponding to the range of key values, can then be merged for read out using existing techniques, such as champion trees. However, binning suffers from an inability to adapt to circumstances, including the contents of the sort and processing resources.

Accordingly, what is desired are techniques to improve parallelization of data sets held in sort runs.

SUMMARY OF INVENTION

Embodiments of the invention include a method comprising sorting a set of records in a sort run based on key values of the set of records, gathering metadata regarding content of the sort run, determining boundary values defining key value bounds of two or more disjoint subsets of the sort run based on the metadata, and outputting sorted data from the two or more disjoint subsets of the sort run in parallel.

Embodiments of the invention additionally include a computer-readable medium having computer-executable instructions stored thereon that, if executed by a computing device, cause the computing device to perform a method comprising sorting a set of records in a sort run based on key values of the set of records, gathering metadata regarding content of the sort run, determining boundary values defining key value bounds of two or more disjoint subsets of the sort run based on the metadata, and outputting sorted data from the two or more disjoint subsets of the sort run in parallel.

Embodiments of the invention further include a system comprising a memory configured to store modules comprising a sorting module configured to sort a set of records in a sort run based on key values of the set of records, a gathering module configured to gather metadata regarding content of the sort run, a determining module configured to determine boundary values defining key value bounds of two or more disjoint subsets of the sort run based on the metadata, and an outputting module configured to output sorted data from the two or more disjoint subsets of the sort run in parallel, and one or more processors configured to process the modules.

Embodiments of the invention further include a method comprising sorting a set of records in a sort run based on key values of the set of records, gathering metadata regarding content of the sort run, the metadata comprising information regarding correspondence of a key value to a page of the sort run, the page comprising a record in the set of records associated with the key value, determining boundary values defining key value bounds of two or more disjoint subsets of the sort run, and outputting sorted data from the two or more disjoint subsets of the sort run in parallel, the sorted data retrieved from the two or more disjoint subsets based on correspondence of records from the two or more disjoint subsets to pages of the sort run.

Embodiments of the invention further include a computer-readable medium having computer-executable instructions stored thereon that, if executed by a computing device, cause the computing device to perform a method comprising sorting a set of records in a sort run based on key values of the set of records, gathering metadata regarding content of the sort run, the metadata comprising information regarding correspondence of a key value to a page of the sort run, the page comprising a record in the set of records associated with the key value, determining boundary values defining key value bounds of two or more disjoint subsets of the sort run, and outputting sorted data from the two or more disjoint subsets of the sort run in parallel, the sorted data retrieved from the two or more disjoint subsets based on correspondence of records from the two or more disjoint subsets to pages of the sort run.

Embodiments of the invention further include a system comprising a memory configured to store modules comprising a sorting module configured to sort a set of records in a sort run based on key values of the set of records, a gathering module configured to gather metadata regarding content of the sort run, the metadata comprising information regarding correspondence of a key value to a page of the sort run, the page comprising a record in the set of records associated with the key value, a determining module configured to determine boundary values defining key value bounds of two or more disjoint subsets of the sort run, and an outputting module configured to output sorted data from the two or more disjoint subsets of the sort run in parallel, the sorted data retrieved from the two or more disjoint subsets based on correspondence of records from the two or more disjoint subsets to pages of the sort run, and one or more processors configured to process the modules.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
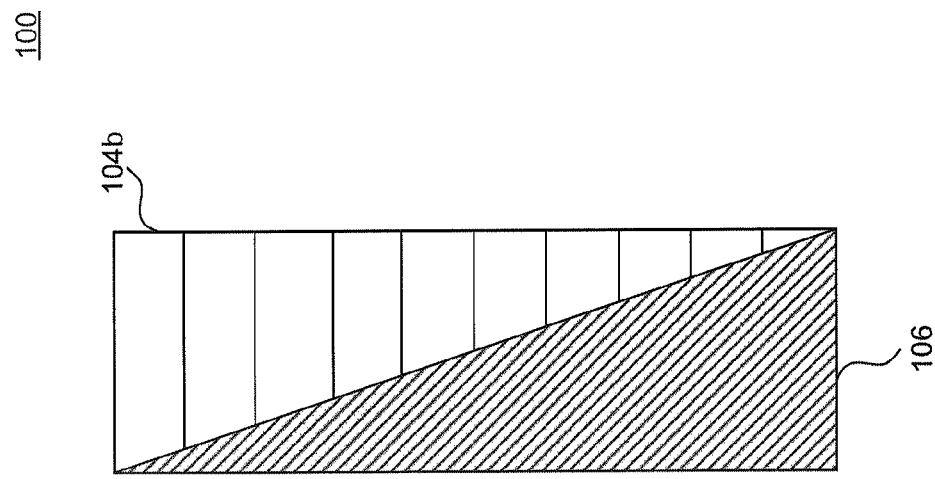
FIG. 1 is an exemplary sort run, in accordance with an embodiment of the present invention.
Figure 1:
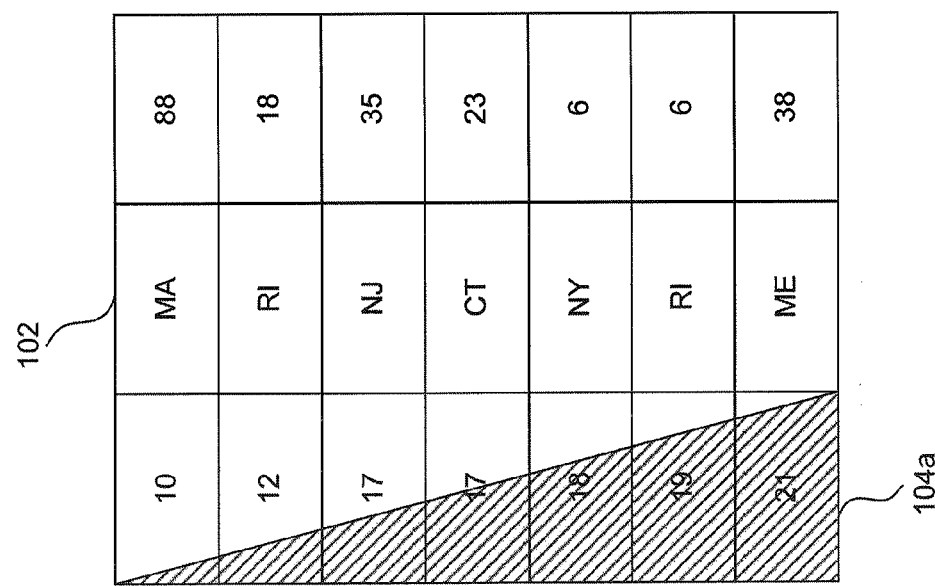

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the present invention.

FIG. 1 is an exemplary sort run 100, in accordance with an embodiment of the present invention. A set of records 102 is received and sorted on some value, in accordance with an embodiment of the present invention. The shading 104*a* denotes that the records are in sorted order.

The number of records shown in 102 corresponds to a page of a sort run 104*b*. Several pages comprising a sort run are, as a whole, sorted as shown by the shading of sort run 106. In accordance with an embodiment of the present invention, several pages of records are loaded into sort run 106 and are sorted as a group. The size of the sort run, and therefore the number of records contained therein, is determined by a memory limit, in accordance with an embodiment of the present invention.

When a sort run is filled, additional sort runs are created from additional records being received, in accordance with an embodiment of the present invention. When sorted data is to be read out from the sort runs, the sort runs are merged via a merging technique, such as the use of a champion tree, and the data is read in sorted order.

Figure 2:
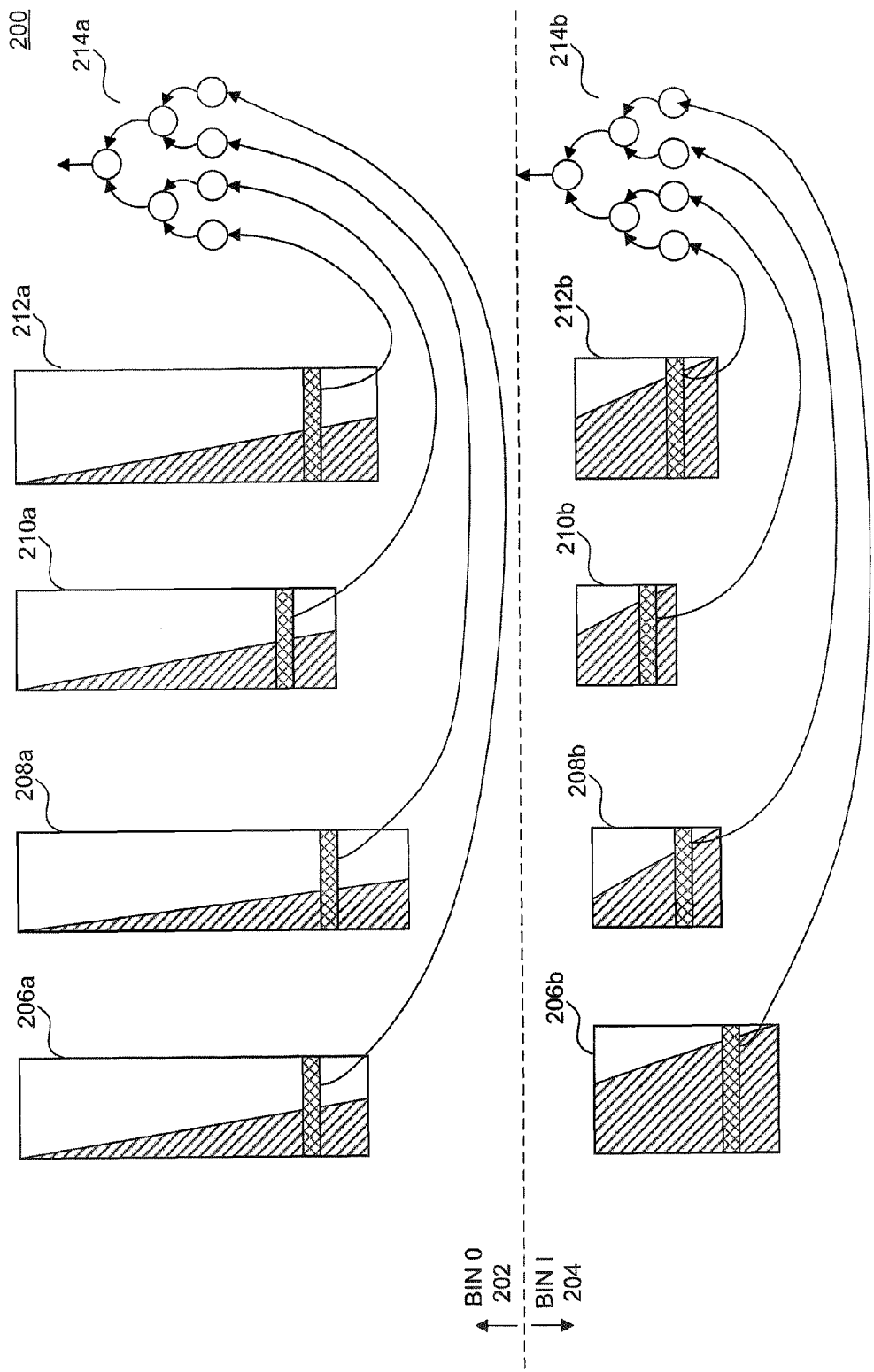
FIG. 2 illustrates a binned disk sort, in accordance with an embodiment of the present invention.

FIG. 2 illustrates a binned disk sort 200, in accordance with an embodiment of the present invention. In a binned disk sort, two or more bins are specified based on a division point corresponding to a key value. For example, when sorting based on integer values, it may be specified that all values less than X should be included in bin #0 202, and all values greater than or equal to X should be included in bin #1 204.

As previously noted, the specified division point is generally provided by a database administrator, either explicitly or using some heuristic determination based on statistical knowledge of key values, and can only be provided at latest at query optimization time. For example, statistical information (such as a histogram) may be available on a data column, but this information is based on the entire column, and may not be applicable when considering only a subset of the data in the data column. Additionally, the ordering key may be an arithmetic expression over the column, so the statistical information would likewise fail to give useful information in this scenario. Therefore, using existing techniques, it would be difficult or impossible to identify any particular division point as coinciding, for example, with an equitable distribution of values, or with the end of a page, in order to obtain any efficiencies in that manner.

As record values are read in, the records are organized in one of two sort runs 206*a* and 206*b*, according to whether a key value for that record is associated with bin #0 202 or bin #1 204. When a memory limit is reached by the combination of sort runs 206*a* and 206*b*, the sort runs are individually sorted and allowed to page to disk. Then, any additional records are similarly placed into binned sort runs, such as sort runs 208*a*/208*b*, 210*a*/210*b*, and 212*a*/212*b*. The shading in the sort runs of binned disk sort 200 illustrates that the values within each sort run are individually sorted, with all of the values in the sort runs 206*a*/208*a*/210*a*/212*a* of bin #0 202 being below a division point, and all of the values in the sort runs 206*b*/208*b*/210*b*/212*b* of bin #1 204 being above a division point.

When reading data out, one technique to provide a sorted output, as previously discussed, is the use of a champion tree (i.e., tournament tree, or heapsort) 214*a*/214*b*. The black bars in each of the sort runs of binned disk sort 200 illustrate a current position within each sort run of a "current record" pointer, in accordance with an embodiment of the present invention. The current record pointer begins at the first record of each sort run, and the record corresponding to the smallest value is read into the champion tree as the root node. One skilled in the relevant arts will recognize that a number of sorting algorithms may be used, and the current record pointer's usage modified accordingly.

As the sort runs corresponding to bin #0 202 and bin #1 204 are separated by a division point, a sort on the data in bin #0 202 can be performed separately from a sort on the data in bin #1 204. This allows for some amount of parallelism to be exploited in the data, as the sorted output of each bin can be processed independently for parallelizable operations.

Binned disk sort 200 illustrates that a problem with this technique is that data may not be evenly distributed among the bins, with no simple way to compensate. Additionally, database resource allocation limitations may effectively limit the number of bins to a small number, hampering parallel scalability and the ability to adjust to a changing environment, as well as possibly requiring costly multi-phase merges when reading out data from the bins.

II. Data Gathering and Metadata Storage

Figure 3:
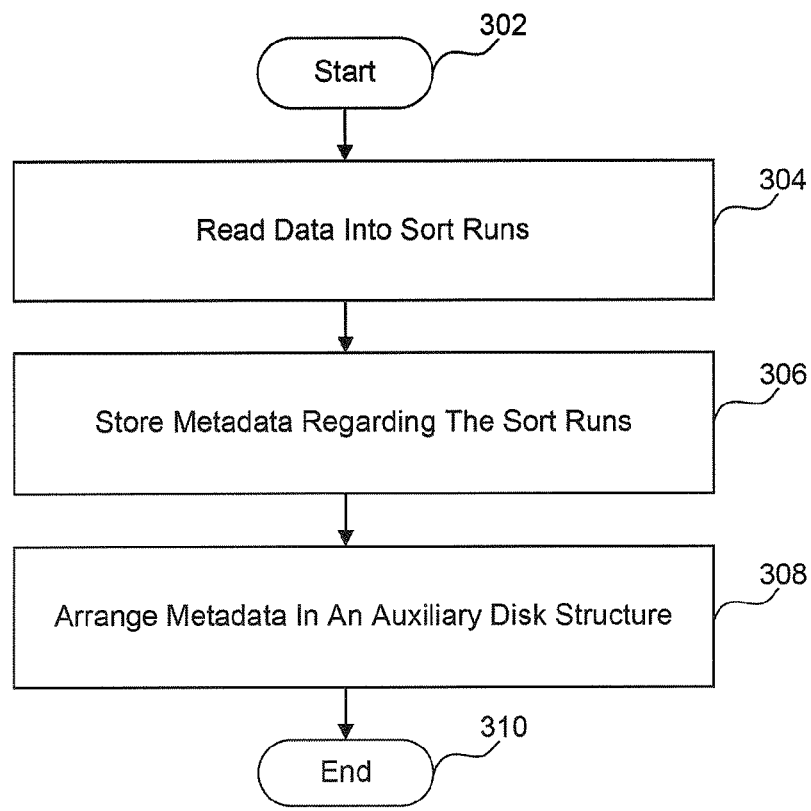
FIG. 3 is a flowchart illustrating steps by which metadata is gathered for a sort run, in accordance with an embodiment of the present invention.

In accordance with an embodiment of the present invention, metadata regarding the records being sorted is gathered in order to assist a determination on how to improve division of the data for parallel processing. FIG. 3 is a flowchart 300 illustrating steps by which metadata is gathered for a sort run, in accordance with an embodiment of the present invention.

The method begins at step 302 and proceeds to step 304 where data is read into sort runs. This involves, in accordance with an embodiment of the present invention, the receipt of a set of records and sorting thereof using a sorting algorithm (e.g., quicksort). In accordance with a further embodiment of the present invention, the sorting algorithm is applied to a set of key values of the set of records, to thereby sort the set of records. At step 306, metadata regarding content of the sort runs is stored. This metadata includes, by way of example and not limitation, a list of important key values within each sort run, in accordance with an embodiment of the present invention. These important key values are, in a further non-limiting embodiment, a list of the first and/or last key values from each page of records in the sort runs, potentially allowing division of sort runs along page boundaries.

One skilled in the relevant arts will appreciate that other sets of important key values may be used. In a further non-limiting exemplary embodiment, the important key values include only the first and/or last key values from every Nth page, or the first location of each Nth distinct value.

At step 308, the metadata is arranged in an auxiliary data structure, in accordance with an embodiment of the present invention. This auxiliary data structure may be ordered based on the list of important key values, described above. It may also itself be a disk pageable data structure and built using a disk sort, in accordance with a further embodiment of the present invention. The method then ends at step 310.

In accordance with an embodiment of the present invention, the auxiliary data structure is configured to store locations of the important key values in a manner that maintains the key value ordering, such as a B-Tree, a sort, an ordered list, or an ordered array, facilitating a choice of division points in the presence of significant data skew. Additionally, by providing the auxiliary data structure in a representation that can scale to arbitrarily large sizes, such as a disk-pageable B-Tree or disk sort, and further by determining division points in key order, access to the auxiliary data structure is effectively linearized and thereby minimizing the number of page thread accesses required while traversing the data structure, in accordance with an embodiment of the present invention.

In accordance with a further embodiment of the present invention, the auxiliary data structure also tracks the number of records in each page of the sort run. Information regarding pages, such as which records are held in a particular page, allows for efficient access of data from a sort run, in accordance with an embodiment of the present invention. In accordance with a further embodiment of the present invention, each page of a sort run provides an identification of a preceding page and a following page, to thereby allow efficient traversal of pages within a sort run.

Efficient access to a sort run is therefore provided by using the metadata to determine a page or range of pages corresponding to a requested record, in accordance with an embodiment of the present invention. For each disjoint range of records being retrieved from a set of sort runs, application of the metadata allows identification of a set of pages that should be accessed from the set of sort runs (e.g., directly within the cache, via a read, etc.) to be able to produce all of the sort records corresponding to the range, in accordance with an embodiment of the present invention. Additionally, this usage works regardless of how range values were determined.

III. Dynamic Determination of Disjoint Key Ranges

Figure 4:
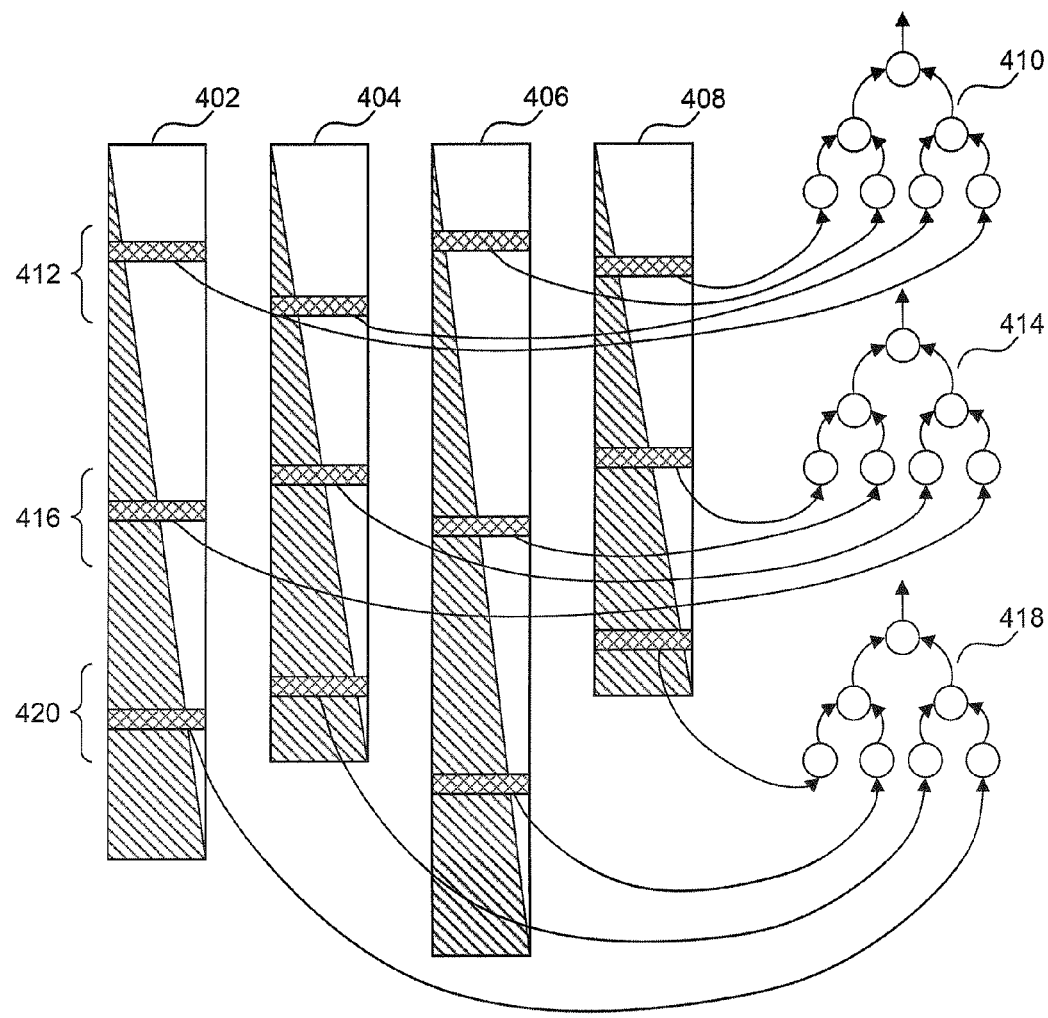
FIG. 4 is an innovative disk sort illustrating the use of dynamic disjoint key ranges, in accordance with an embodiment of the present invention.

FIG. 4 is an innovative disk sort 400 illustrating the use of dynamic disjoint key ranges, in accordance with an embodiment of the present invention. As with a traditional disk sort, data is read into several sort runs 402, 404, 406, and 408, and sorted within the sort run. At some point, such as when the data has been sorted in the sort runs, the metadata described in Section II is gathered for use in determining disjoint subsets of data.

As with the output of a binned disk sort, data is read from a current record pointer 412, 416, 420 into a corresponding champion tree 410, 414, 418 or other merge sort structure, in accordance with an embodiment of the present invention. However, in this case, division points determining the bounds of the current record pointers are not fixed, and are instead determined dynamically based on metadata and current system status information, in accordance with a further embodiment of the present invention. Additionally, the number of division points may also be determined dynamically using similar factors, in accordance with an embodiment of the present invention.

In a non-limiting example, as noted in Section II, the metadata may include a list of key values marking the beginning of each page, in accordance with an embodiment of the present invention. Moreover, the metadata may include an identification of the number of records included in each page. Accordingly, in the example disk sort 400 of FIG. 4, three parallel threads of execution may be initiated on disjoint subsets, where each disjoint subset begins on page bounds and comprises approximately a same number of pages (and records). Adjustments can subsequently be made if, for example, resources for the execution of additional threads become available, or if threads must be killed in order to release resources for use by higher priority tasks.

As one skilled in the relevant arts will recognize, however, the precise technique by which the size of the disjoint subsets is selected will vary based on desired optimizations, and this disclosure contemplates any such variation on the exemplary techniques disclosed herein.

IV. Parallelization of Database Operations

In accordance with an embodiment of the present invention, separation of sort runs into disjoint subsets allows for processing of instructions in parallel on each subset. This is permissible in an instance where application of an operator of the instruction to any of the subsets is functionally independent of the contents of any other of the subsets.

An example of this would be the GROUP BY operation, where grouping can be performed on the values of each of the disjoint subsets, and no data is needed from an additional subset in order to properly complete the operation. Similarly, a sort-based DISTINCT operation or a MERGE JOIN operation could be applied to each of the disjoint subsets in parallel.

Figure 5:
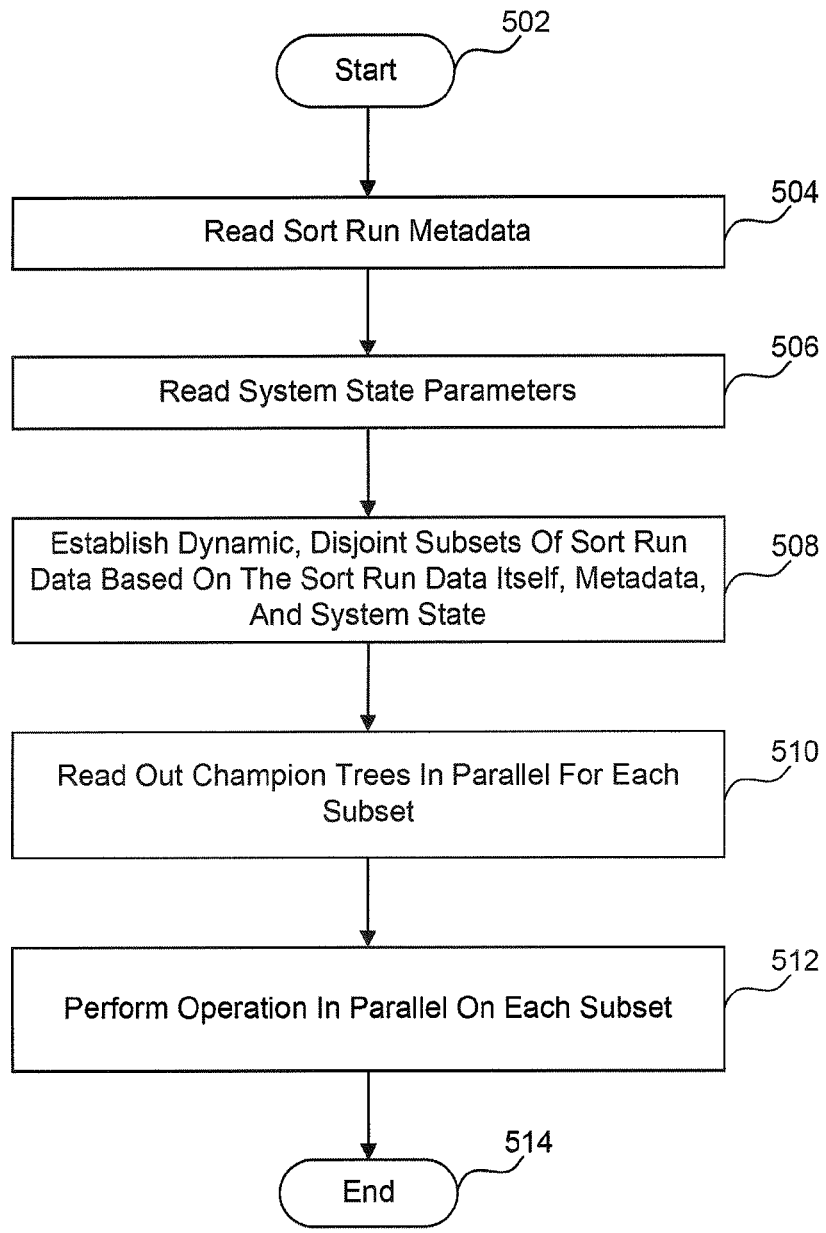
FIG. 5 is a flowchart illustrating steps by which an operation is applied in parallel to disjoint subsets of a sort run, in accordance with an embodiment of the present invention.

FIG. 5 is a flowchart 500 illustrating steps by which an operation is applied in parallel to disjoint subsets of a sort run, in accordance with an embodiment of the present invention. The method begins at step 502 and proceeds to step 504 where metadata regarding the sort run, such as metadata described in Section II, is read, in accordance with an embodiment of the present invention. In accordance with a further embodiment of the present invention, system state parameters (e.g., availability of processor/processing core time, availability of memory (e.g., cache memory), etc.) are read at step 506.

At step 508, division points establishing dynamic, disjoint subsets of sort run data are determined, in accordance with an embodiment of the present invention. In accordance with a further embodiment of the present invention, the division points are based on the sort run data itself, the metadata, and/or the system state. Division points are determined individually for each set of sort runs, in accordance with an additional embodiment of the present invention.

In a non-limiting example, if a division point over the set of sort runs is being determined for two available parallel processing units, the metadata is analyzed in order to establish a division point where an equitable distribution of key values exist on both sides. In accordance with an embodiment of the present invention, with an even distribution of key values for a given range of the values, the division point will correspond to a median key value. One skilled in the relevant arts will recognize that the division point need not correspond to a key value that is actually present in the set of sort runs, and can be any value used to associate key values from the set of sort runs with a particular disjoint subset of the sort run data. For example, for an evenly-distributed set of key values in the range 0-1000, the division point for a two processing unit configuration may be based around a value of 500. This would direct data associated with a key value of, for example, less-than 500 to be directed to a first processing unit, and data associated with a key value of greater-than-or-equal-to 500 to be directed to a second processing unit, thereby creating two approximately-evenly-distributed disjoint subsets of data.

At step 510, champion trees, or other merged data structure, are read out in parallel for each of the disjoint subsets, in accordance with an embodiment of the present invention. It is then possible to perform the desired operation, such as a GROUP BY, DISTINCT, MERGE JOIN, etc. operation, in parallel on each merged data structure output at step 512, in accordance with an embodiment of the present invention. The method then ends at step 514.

A number of operations benefit from application of this kind of parallelizable sorted data. As noted, a sort-based grouping query, such as GROUP BY, benefits from this methodology. Typically, the GROUP BY operation works by retrieving data from a table, sorting the data, and then grouping the sorted data to produce the desired result. By performing the sorting operation first, items to be grouped will be sorted next to each other. The grouping operation then becomes highly efficient, as an algorithm might only have to, for example, determine if the next sorted element is of the same value as the current one and, if so, group them together.

Using the parallelizing techniques described above, both the sorting and grouping phases of this operation can be parallelized, in accordance with an embodiment of the present invention. As noted, sorting into champion trees (or other merged data output) is accomplished in parallel for each disjoint subset. Additionally, the grouping operation can itself be performed in parallel on the merged data output of each disjoint subset, leading to further efficiencies. Then, when the grouping operations are completed on all of the disjoint subsets, an N-to-1 exchange is performed to collect the work of the individual processing threads, and a result provided from the gathered thread work.

Additionally, a MERGE JOIN can perform sort operations in parallel on two individual sets of sort runs corresponding to data values to be merged, in accordance with an embodiment of the present invention. When these results are to be merged, additional efficiencies may be realized by analyzing metadata from the two sets of merged outputs in order to increase efficiency of the merge operation. One skilled in the relevant arts will recognize that other operators may find similar benefits in these parallelization techniques. This combined analysis allows for the determination of division points across sort runs from two or more sets of disk sorts, in accordance with an embodiment of the present invention.

V. Example Computer System Implementation

Figure 6:
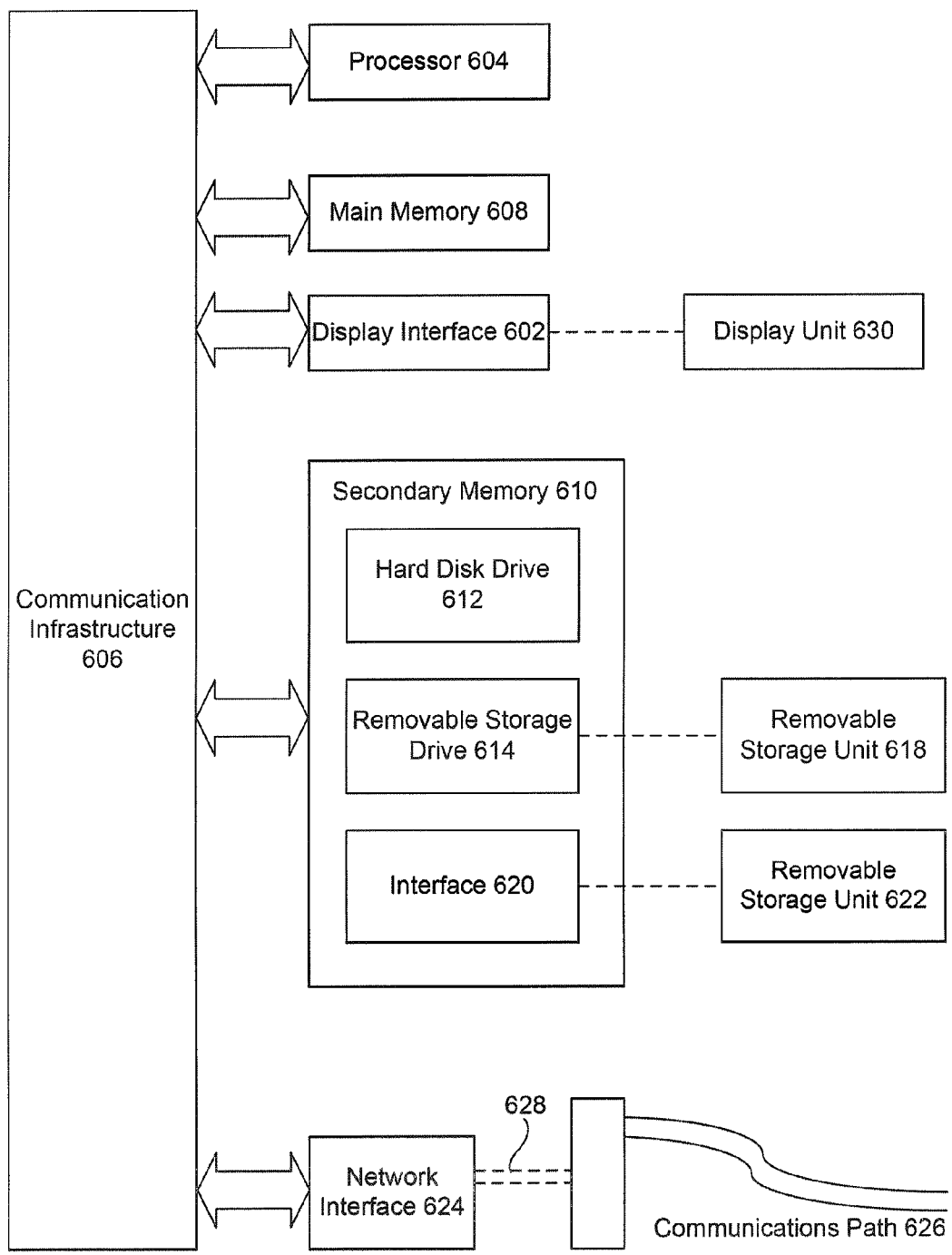
FIG. 6 depicts an example computer system in which embodiments of the present invention may be implemented.

Various aspects of the present invention can be implemented by software, firmware, hardware, or a combination thereof. FIG. 6 illustrates an example computer system 600 in which the present invention, or portions thereof, can be implemented as computer-readable code. For example, the methods illustrated by flowcharts 300 of FIG. 3 and 500 of FIG. 5, can be implemented in system 600. Various embodiments of the invention are described in terms of this example computer system 600. After reading this description, it will become apparent to a person skilled in the relevant art how to implement the invention using other computer systems and/or computer architectures.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612, a removable storage drive 614, and/or a memory stick. Removable storage drive 614 may comprise a floppy disk drive, a magnetic tape drive, an optical disk drive, a flash memory, or the like. The removable storage drive 614 reads from and/or writes to a removable storage unit 618 in a well known manner. Removable storage unit 618 may comprise a floppy disk, magnetic tape, optical disk, etc. that is read by and written to by removable storage drive 614. As will be appreciated by persons skilled in the relevant art(s), removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 that allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals that may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Signals carried over communications path 626 can also embody the logic described herein. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor 604 to implement the processes of the present invention, such as the steps in the methods illustrated by flowcharts 300 of FIG. 3 and 500 of FIG. 5, discussed above. Accordingly, such computer programs represent controllers of the computer system 600. Where the invention is implemented using software, the software may be stored in a computer program product and loaded into computer system 600 using removable storage drive 614, interface 620, hard drive 612 or communications interface 624.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:
   receiving data and packaging the data into a set of records;
   placing the set of records into a set of pages to form a sort run until reaching a memory limit;
   sorting the set of records in the sort run based on key values of the set of records;
   gathering metadata regarding content of the sort run providing an identification of a number of records in each page, including metadata regarding the key values of the set of records in the sort run and a list of key values occurring on page boundaries of the sort run;
   determining, by a computing device, boundary values dynamically defining key value bounds of two or more disjoint subsets of the sort run based on the metadata, the two or more disjoint subsets having a proportional number of pages and records; and
   outputting sorted data from the two or more disjoint subsets of the sort run in parallel.

2. The method of claim 1, further comprising:
   storing the metadata regarding content of the sort run in an auxiliary data structure that maintains key value ordering.

3. The method of claim 1, wherein determining boundary values dynamically defining the key value bounds of the two or more disjoint subsets of the sort run further comprises:
   determining the key value bounds of the disjoint subsets based further on distribution disparities in the sort run and system state parameters.

4. The method of claim 1, wherein determining boundary values dynamically defining the key value bounds of the two or more disjoint subsets of the sort run further comprises:
   dynamically determining a total number of disjoint subsets.

5. The method of claim 1, further comprising:
   receiving an instruction to process an operator depending on ordered data from the sort run, wherein application of the operator to any of the two or more disjoint subsets is functionally independent of the contents of any other of the two or more disjoint subsets.

6. The method of claim 5, further comprising:
   processing the instruction in parallel on first and second subsets of the two or more disjoint subsets.

7. The method of claim 1, further comprising:
   revising the key value bounds of two or more disjoint subsets based on system state parameters.

8. The method of claim 1, wherein determining boundary values dynamically defining key value bounds of two or more disjoint subsets of the sort run comprises:
   determining boundary values dynamically defining the key value bounds of the two or more disjoint subsets of the sort run and of an additional sort run based on the metadata and additional metadata corresponding to the additional sort run.

9. A non-transitory computer-readable storage medium having computer-executable instructions stored thereon that, in response to being executed by a computing device, cause the computing device to perform operations comprising:
receiving data and packaging the data into a set of records;
placing the set of records into a set of pages to form a sort run until reaching a memory limit;
sorting the set of records in the sort run based on key values of the set of records;
gathering metadata regarding content of the sort run providing an identification of a number of records in each page, including metadata regarding the key values of the set of records in the sort run and a list of key values occurring on page boundaries of the sort run;
determining boundary values dynamically defining key value bounds of two or more disjoint subsets of the sort run based on the metadata, the two or more disjoint subsets having a proportional number of pages and records; and outputting sorted data from the two or more disjoint subsets of the sort run in parallel.

10. The non-transitory computer-readable storage medium of claim 9, the operations further comprising:
storing the metadata regarding content of the sort run in an auxiliary data structure that maintains key value ordering.

11. The non-transitory computer-readable storage medium of claim 9, wherein determining boundary values dynamically defining the key value bounds of the two or more disjoint subsets of the sort run further comprises:
determining the key value bounds of the disjoint subsets based further on distribution disparities in the sort run and system state parameters.

12. The non-transitory computer-readable storage medium of claim 9, wherein determining boundary values dynamically defining the key value bounds of the two or more disjoint subsets of the sort run further comprises:
dynamically determining a total number of disjoint subsets.

13. The non-transitory computer-readable storage medium of claim 9, the operations further comprising:
receiving an instruction to process an operator depending on ordered data from the sort run, wherein application of the operator to any of the two or more disjoint subsets is functionally independent of the contents of any other of the two or more disjoint subsets.

14. The non-transitory computer-readable storage medium of claim 13, the operations further comprising:
processing the instruction in parallel on first and second subsets of the two or more disjoint subsets.

15. The non-transitory computer-readable storage medium of claim 9, the operations further comprising:
revising the key value bounds of two or more disjoint subsets based on system state parameters.

16. The non-transitory computer-readable storage medium of claim 9, wherein determining boundary values dynamically defining key value bounds of two or more disjoint subsets of the sort run comprises:
determining boundary values dynamically defining the key value bounds of the two or more disjoint subsets of the sort run and of an additional sort run based on the metadata and additional metadata corresponding to the additional sort run.

17. A system comprising:
a memory configured to store modules comprising:
a receiving module configured to receive data and package the data into a set of records;
a paging module configured to place the set of records into a set of pages to form a sort run until reaching a memory limit;
a sorting module configured to sort the set of records in the sort run based on key values of the set of records,
a gathering module configured to gather metadata regarding content of the sort run providing an identification of a number of records in each page, including metadata regarding the key values of the set of records in the sort run and a list of key values occurring on page boundaries of the sort run,
a determining module configured to determine boundary values dynamically defining key value bounds of two or more disjoint subsets of the sort run based on the metadata, the two or more disjoint subsets having a proportional number of pages and records, and
an outputting module configured to output sorted data from the two or more disjoint subsets of the sort run in parallel; and
one or more processors configured to process the modules.

18. A method comprising:
receiving data and packaging the data into a set of records;
placing the set of records into a set of pages to form a sort run until reaching a memory limit;
sorting the set of records in the sort run based on key values of the set of records;
gathering metadata regarding content of the sort run, the metadata comprising information regarding correspondence of a key value to a page of the sort run and providing an identification of a number of records in each page and a list of key values occurring on page boundaries of the sort run, the page comprising a record in the set of records associated with the key value;
determining, by a computing device, boundary values dynamically defining key value bounds of two or more disjoint subsets of the sort run, the two or more disjoint subsets having a proportional number of pages and records; and
outputting sorted data from the two or more disjoint subsets of the sort run in parallel, the sorted data retrieved from the two or more disjoint subsets based on correspondence of records from the two or more disjoint subsets to pages of the sort run.

19. A non-transitory computer-readable storage medium having computer-executable instructions stored thereon that, in response to being executed by a computing device, cause the computing device to perform operations comprising:
receiving data and packaging the data into a set of records;
placing the set of records into a set of pages to form a sort run until reaching a memory limit;
sorting the set of records in the sort run based on key values of the set of records;
gathering metadata regarding content of the sort run, the metadata comprising information regarding correspondence of a key value to a page of the sort run and providing an identification of a number of records in each page and a list of key values occurring on page boundaries of the sort run, the page comprising a record in the set of records associated with the key value;
determining boundary values dynamically defining key value bounds of two or more disjoint subsets of the sort run, the two or more disjoint subsets having a proportional number of pages and records; and
outputting sorted data from the two or more disjoint subsets of the sort run in parallel, the sorted data retrieved from the two or more disjoint subsets based on correspondence of records from the two or more disjoint subsets to pages of the sort run.

20. A system comprising:

a memory configured to store modules comprising:

a receiving module configured to receive data and package the data into a set of records;

a paging module configured to place the set of records into a set of pages to form a sort run until reaching a memory limit;

a sorting module configured to sort a set of records in a sort run based on key values of the set of records, a gathering module configured to gather metadata regarding content of the sort run, the metadata comprising information regarding correspondence of a key value to a page of the sort run and providing an identification of a number of records in each page and a list of key values occurring on page boundaries of the sort run, the page comprising a record in the set of records associated with the key value, a determining module configured to determine boundary values dynamically defining key value bounds of two or more disjoint subsets of the sort run, the two or more disjoint subsets having a proportional number of pages and records, and an outputting module configured to output sorted data from the two or more disjoint subsets of the sort run in parallel, the sorted data retrieved from the two or more disjoint subsets based on correspondence of records from the two or more disjoint subsets to pages of the sort run; and one or more processors configured to process the modules.

* * * * *